United States Patent
Luo (10) Patent No.: US 6,697,502 B2
(45) Date of Patent: Feb. 24, 2004

(54) IMAGE PROCESSING METHOD FOR DETECTING HUMAN FIGURES IN A DIGITAL IMAGE

(75) Inventor: Jiebo Luo, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 587 days.

(21) Appl. No.: 09/737,026

(22) Filed: Dec. 14, 2000

(65) Prior Publication Data

US 2002/0076100 A1 Jun. 20, 2002

(51) Int. Cl.$^7$ ................................................ G06K 9/00
(52) U.S. Cl. ...................... 382/115; 382/164; 382/168; 382/118
(58) Field of Search ................................ 382/118, 164, 382/168, 120, 171, 172, 203, 209, 224, 225, 165, 190, 115, 117; 358/522; 340/5.52, 5.53, 5.82, 5.83

(56) References Cited

U.S. PATENT DOCUMENTS 5,629,752 A * 5/1997 Kinjo ........................... 355/35
5,835,616 A    11/1998 Lobo et al.
6,445,810 B2 * 9/2002 Darrell et al. ............... 382/115
6,618,490 B1 * 9/2003 Cham et al. ................. 382/103

OTHER PUBLICATIONS

Pedestrian Detection Using Wavelet Templates, by: Michael Oren et al., CVPR, Jun. 17–19, 1997, Puerto Rico.
Probabilistic Reasoning in Intellegent Systems: Networks of Plausible Inference, revised Second printing, by: Judea Pearl, Department of Computer Science, University of California, Morgan Kaufmann, 1998.
Digital Image Processing, by: Rafael C. Gonzalez of University of Tennessee, Perceptics Corporation, Richards E. Woods, Perceptics Corporation, 1992.
A Robust Automatic Clustering Scheme for Imaging Segmentation Using Wavelets, by: Richard Porter, Nisham Canagarajah, 1996 IEEE Transactions of Image Processing, vol. 5, No. 4, Apr. 1996.
Efficient Matching of Pictorial Structures, by: Pedro F. Felzenszwalb, Daniel P. Huttenlocher, pp. 66–73, IEEE, 2000.
Towards Physics–based Segmentation of Photographic Color Images, by: Jiebo Luo, Robert T. Gray, Hsien–Che Lee, IEEE International conference on Image Processing, 1997.
Color Image Quantization Based on Physics and Psychophysics, by: Hsien–Che Lee, Journal of Society of Photographic Science and Technology of Japan, vol. 59, No. 1, pp. 212–225, 1996.
Factor Graphs and the Sum–Product Algorithm, by: Frank K. Kschischang, Brendan J. Frey, Hans–Andrea Loeliger, Oct. 19, 2000, pp 1–50, IEEE Transactions on Information Theory.
Finding Naked People, by: Margaret M. Fleck, David A. Fosyth, Chris Bregler, Department of Computer Science, University of Iowa, Computer Science Division, Berkeley, University, California, 1996 European Conference on Computer Vision, vol. II, pp. 592–602.

* cited by examiner

Primary Examiner—Bhavesh M. Mehta
Assistant Examiner—Ali Bayat
(74) Attorney, Agent, or Firm—William F. Noval (57) ABSTRACT

A digital image processing method for detecting human figures in a digital color image, comprising the steps of: providing a digital color image having pixels representing RGB values; segmenting the image into non-overlapping regions of homogeneous color or texture; detecting candidate regions of human skin color; detecting candidate regions of human faces; and for each candidate face region, constructing a human figure by grouping regions in the vicinity of the face region according to a pre-defined graphical model of the human figure, giving priority to human skin color regions.

13 Claims, 6 Drawing Sheets

IMAGE PROCESSING METHOD FOR DETECTING HUMAN FIGURES IN A DIGITAL IMAGE

FIELD OF THE INVENTION

This invention relates in general to field of digital image processing and computer vision, and more particularly to methods for detecting human figures in a digital image.

BACKGROUND OF THE INVENTION

Digital images are widely used in image communication. One opportunity opened by digital images is that it becomes possible to use computer vision techniques to detect objects of interest in images. Among all conceivable objects found in images, human figures stand out as the one of the highest general interest.

There have been extensive research and development activities over the past two decades on human face detection. For example, in U.S. Pat. No. 5,835,616, issued Nov. 11, 1998 to Lobo. Lobo discloses a two step process for automatically finding a human face in an electronically digitized image (for example, taken by handheld digital cameras and digital video-cameras such as camcorders), and for confirming the existence of the face by examining facial features. Step 1 is to detect the human face and is accomplished in stages that include enhancing the digital image with a blurring filter and edge enhancer in order to better set forth the unique facial features such as wrinkles, and curved of a facial image. After prefiltering, preselected curves sometimes referred to as snakelets are dropped on the image where they become aligned to the natural wrinkles and curves of a facial image. Step 2 is to confirm the existence of the human face in seven stages by finding facial features of the digital image encompassing the chin, sides of the face, virtual top of the head, eyes, mouth and nose of the image. Ratios of the distances between these found facial features can be compared to previously stored reference ratios for recognition. This method for detecting facial features in an image can be used in applications such as but not limited to detecting human faces for the gathering of population age-statistics from patrons at entertainment/amusement parks and television network viewer-rating studies. Such gathering can include counting the patrons, distinguishing certain age and gender groups, and/or identifying specific people. Computer vision with this capability can further have application in such fields as automated surveillance systems, demographic studies, automated photography for point-and-shoot cameras and human computer interactions. Automated photography can eliminate the manual adjustment problems that result in poor quality from lack of focused subjects. Computer systems can utilize this system to recognize and respond to the specific needs of a user, and further translate for human users.

The value of "face detection" in various applications is already known. However, "person detection" or "human figure detection" could potentially give yet more information, for two reasons: person detection encompasses more than just the face, and person detection can be successful in situations where face detection is not.

Main subject detection, exposure compensation for subject, and image compositing would all benefit from knowledge of person-regions instead of only face regions. In a picture of a person, the main subject is usually not just the face, but the whole person. For digital editing, it is also quite reasonable to insist that the whole person be treated as a unit in compositing or zooming and cropping rather than working with disembodied faces. And in exposure compensation, it may be argued that proper compensation for a subject should include consideration not only of the face but also the associated hair and clothing.

Face detection can be expected to fail when the face in the photograph is "too small," perhaps on the order of a 10 pixel eye-to-eye distance, or out of focus. For such pictures some types of person-detector may still succeed. In that case person-detection may be considered a replacement for face-detection in applications where face detection would otherwise be helpful, such as frame orientation determination and main subject detection.

The ideal person detector would label each pixel of an image according to whether or not it is part of a person, and if so which person it is associated with. Pixels associated with a person include the body and hair and worn clothing—basically anything that moves as a unit with the person. Person detection should be successful regardless of pose, posture, cropping, occlusion, costume, or other atypical circumstances. Objects held in the hands—an umbrella, a bag, a baby—are a gray area and may be included or excluded depending on the specific application.

It should be apparent that this is a hard problem. It encompasses close-up "head and shoulder" views of one or two persons, to medium-range group pictures of seated persons partially occluding standing persons, to distant crowds composed of many mostly-occluded persons, possibly with backs turned to the camera.

A few approaches known in the prior art and dealing with similar problems include the following:

Oren et al. disclosed a method for pedestrian detection using wavelet-based templates in the Proceedings of Computer Vision and Pattern Recognition, 1997. The method is based on template matching, which refers to applying a predetermined intensity pattern ("template") across the image for all locations and possible sizes of the actual object ("pedestrian"). Wavelet templates are used to reduce the sensitivity to variations in subject clothing and lighting conditions. It is only suitable for "pedestrian", i.e., low-detail figures in walking gesture. It is also computationally expensive because of the exhaustive search for all locations and sizes.

Forsyth et al. disclosed a method for "naked people" detection using skin detection and limb grouping (David Forsyth, Margaret Fleck, and Chris Bregler, "Finding Naked People", 1996 European Conference on Computer Vision, Volume II, pp. 592–602.). They first locate images containing large areas of skin-colored region, and then find elongated regions and group them into possible human limbs and connected groups of limbs. The assumptions are:

humans are made of parts whose shape is relative simple;

there are few ways to assemble these parts;

the kinematics of the assembly ensures that many configurations are impossible; and when one can measure motion, the dynamics of these parts are limited.

They use the following model:

skin regions lack texture and have a limited range of hues and saturation;

grouping rules to assemble simple groups (body segments) into complex groups (limb-segment girdles), incorporating constraints on the relative positions of 2D features, induced by geometric and kinematic constraints on 3D body parts;

grouping are performed on edge segments: pairs of edge points with a near-parallel local symmetry and no other edges in between; sets of points forming regions with roughly straight axes ("ribbons");

pairs of ribbons whose ends lie close together, and whose cross-sections are similar in length, are group together to make limbs;

limbs are grouped together into putative girdles; and segments are grouped to form spine-thigh group.

The problems with this method are:

some suggested grouping rules are not complete; and clothed people are hard to segment because clothing is often marked with complex patterns, subject to distortion caused by changes in surface orientation.

Felzenszwalb and Huttenlocher disclosed a method for human figure matching using a deformable model in the Proceedings of Computer Vision and Pattern Recognition, 2000. This method is based on matching of a deformable model represented by spring-like connections between pairs of parts. The human figure model is the following: each part fits a rectangular box of the same intensity; each connection specifies the cost associated with deviations in each of the relative orientation, size, and joint alignment.

The problems with this method are:

detection is limited to matching a known human figure with known parts (the model has to be built for the expected person in the image;

parts are not obtained in a robust fashion (possible part locations are quantized into 50 buckets for each of the x and y positions, 10 buckets for size and 20 buckets for orientation);

matching result is a rough location of the person and is inadequate for many applications.

The method taught by Oren et al. assumes that the human figure is stand-up position (pedestrian), full-figure with no or little occlusion.

The method taught by Forsyth et al. is based on a number of assumptions, such as:

The human figure is naked;

All the human body parts can be detected as skin regions; and

All background regions are not detected as skin regions.

The method taught by Felzenszwalb et al. is designed primarily for matching of a known human figure rather than detection of an unknown human figure. It is also based on a number of assumptions, such as:

The human figure model is pre-specified and does not change;

All the exposed human body parts can be detected as uniformly skin colored regions; and All the clothing parts are detected as uniformly colored regions.

These assumptions, however, may not hold for many image applications. For example, in most applications, it is not feasible to build a model of the human figure before the search, or restrict the pose to a stand-up position. Also, in most application, people would wear some kind of clothing.

There is a need therefore for a more efficient algorithm that detects generic human figures in an image without making any assumption of the pose, posture, cropping, occlusion, costume, or other atypical circumstances. The only assumptions are that the image is of reasonable quality so that different regions can be discerned, and that the human figures are of reasonable sizes so that body parts can be segmented.

SUMMARY OF THE INVENTION

According to the present invention, there is provided a solution to the problems of the prior art. The need is met according to the present invention by providing a digital image processing method for detecting human figures in a digital color image having pixels representing RGB values, comprising the steps of: segmenting the image into non-overlapping regions of homogeneous color or texture; detecting candidate regions of human skin color; detecting candidate regions of human faces; and for each candidate face region, constructing a human figure by grouping regions in the vicinity of the face region according to a predefined graphical model of the human figure, giving priority to human skin color regions.

According to a feature of the present invention, there is provided a digital image processing method for detecting human figures in a digital color image having pixels representing RGB values, comprising the steps of:

providing a digital color image having pixels representing RGB values;

segmenting the digital color image into non-overlapping regions of homogeneous color or texture;

detecting candidate regions of human skin color;

detecting candidate regions of human faces; and for each candidate face region, constructing a human figure by grouping regions in the vicinity of the face region according to a pre-defined graphical model of the human figure, giving priority to human skin color regions.

ADVANTAGEOUS EFFECT OF THE INVENTION

The present invention has the advantage that clothed, unknown human figures can be more reliably detected in a digital image.

DETAILED DESCRIPTION OF THE INVENTION

In the following description, a preferred embodiment of the present invention will be described as an image processing method that would ordinarily be embodied as a software program. Those skilled in the art will readily recognize that the equivalent of such software may also be constructed in hardware. Because image manipulation algorithms and systems for running such algorithms are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown, described or suggested herein may be selected from such systems, algorithms, components and elements known in the art. Given the method as described according to the invention in the following materials, software not specifically shown or described herein that is useful for implementation of the invention is conventional and within the ordinary skill in such arts.

Furthermore, as used herein, the computer program may be stored in a computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
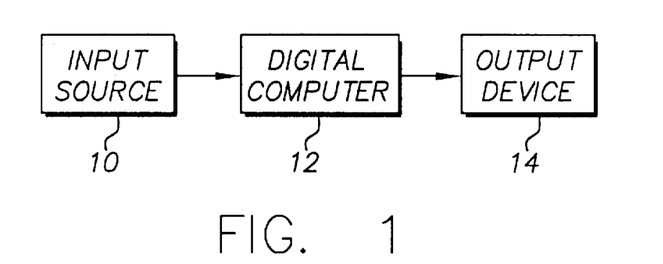
FIG. 1 is a block diagram showing an image processing system suitable for practicing the image processing method according to the present invention.

The present invention relates to a method for locating human figures in a digital image. Referring to FIG. 1, a typical image processing system suitable for practicing the present invention is illustrated. An input digital image comes from an input source 10, e.g., a digital camera or scanner, an Internet connection, a separate storage device, or the like. A computer 12 then processes the input digital image according to the present invention to generate an output image, which will be sent to an output device 14, e.g., a digital printer, a display device, an Internet connection, a separate storage device, or the like.

Figure 2:
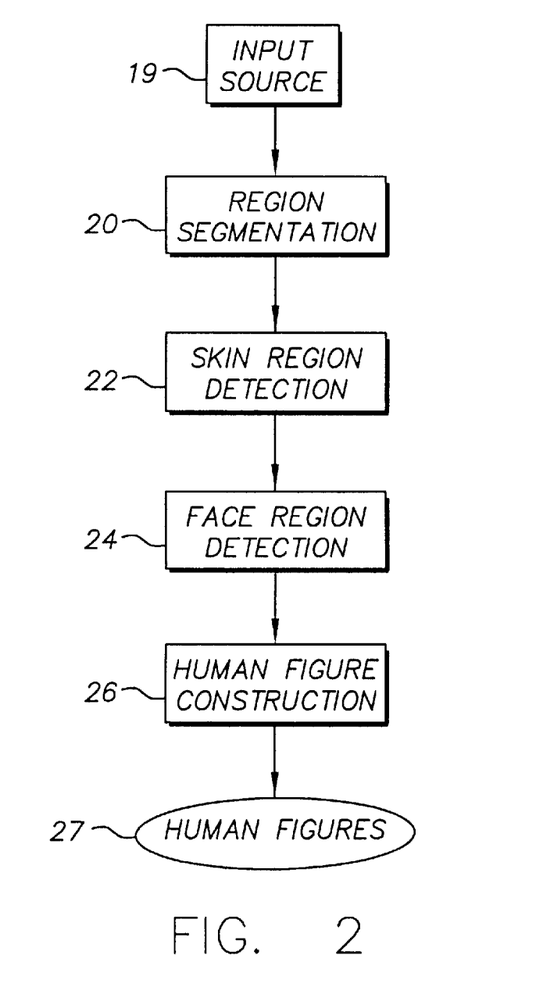
FIG. 2 is a flow chart showing one embodiment of the image processing method according to the present invention.

FIG. 2 shows a flow chart of the current embodiment of the image processing method according to the present invention, which will be described in greater detail below.

As generally shown in FIG. 2, the image processing method of the present invention includes four modules to process an input image 19 to generate a human figure output 27, as outlined below:

an image segmentation module (20);
a skin detection module (22);
a face detection module (24); and
a human figure construction module (26).

The modules will now be separately described in further detail.

Image Segmentation (20)

The adaptive Bayesian color segmentation algorithm (Luo et al., "Towards physics-based segmentation of photographic color images," Proceedings of the IEEE International Conference on Image Processing, 1997) is used to generate a tractable number of physically coherent regions of arbitrary shape. Although this segmentation method is preferred, it will be appreciated that a person of ordinary skill in the art can use a different segmentation method to obtain object regions of arbitrary shape without departing from the scope of the present invention. Segmentation of arbitrarily shaped regions provides the advantages of: (1) accurate measure of the size, shape, location of and spatial relationship among objects; (2) accurate measure of the color and texture of objects; and (3) accurate classification of key subject matters.

Figure 4:
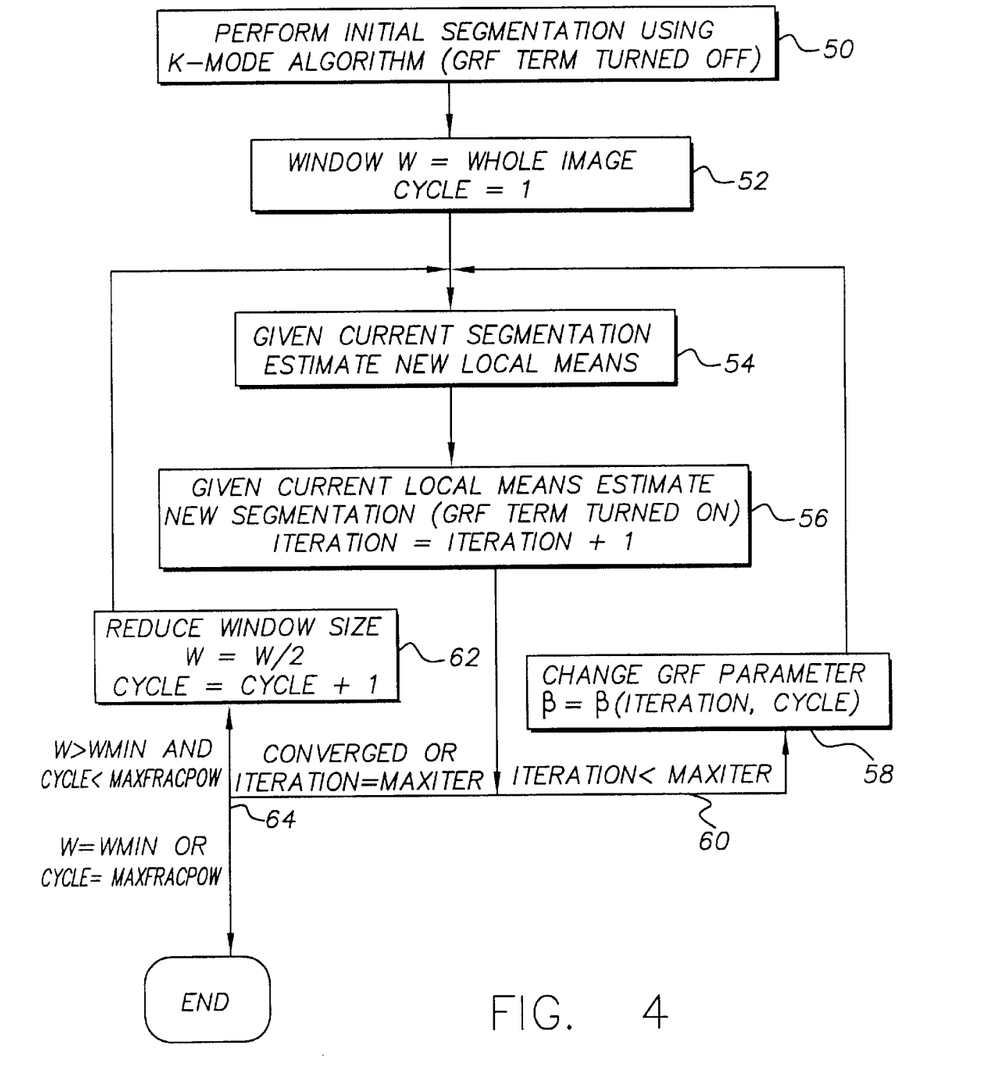
FIG. 4 is block diagram of a preferred segmentation method used with the present invention.

Referring to FIG. 4, there is shown a block diagram of the preferred segmentation algorithm. First, an initial segmentation of the image into regions is obtained (50). The segmentation is accomplished by compiling a color histogram of the image and then partitioning the histogram into a plurality of clusters that correspond to distinctive, prominent colors in the image. Each pixel of the image is classified to the closest cluster in the color space according to a preferred physics-based color distance metric with respect to the mean values of the color clusters as described in (Luo et al., "Towards physics-based segmentation of photographic color images," Proceedings of the IEEE International Conference on Image Processing, 1997). This classification process results in an initial segmentation of the image. A neighborhood window is placed at each pixel in order to determined what neighborhood pixels are used to compute the local color histogram for this pixel. The window size is initially set at the size of the entire image (52), so that the local color histogram is the same as the one for the entire image and does not need to be recomputed.

Next, an iterative procedure is performed between two alternating processes: re-computing (54) the local mean values of each color class based on the current segmentation, and re-classifying the pixels according to the updated local mean values of color classes (56). This iterative procedure is performed until a convergence is reached (60). During this iterative procedure, the strength of the spatial constraints can be adjusted in a gradual matter (58) (for example, the value of $\beta$, which indicates the strength of the spatial constraints, is increased linearly with each iteration). After the convergence is reached for a particular window size, the window used to estimate the local mean values for color classes is reduced by half in size (62). The iterative procedure is repeated for the reduced window size to allow more accurate estimation of the local mean values for color classes. This mechanism introduces spatial adaptivity into the segmentation process. Finally, segmentation of the image is obtained when the iterative procedure reaches convergence for the minimum window size (64).

The above described segmentation algorithm can be extended to perform texture segmentation. Instead of using color values as the input to the segmentation, texture features are used to perform texture segmentation using the same framework. An example type of texture features is wavelet features (R. Porter and N. Canagaraj ah, "A robust automatic clustering scheme for image segmentation using wavelets," IEEE Transaction on Image Processing, vol.~5, pp.~662–665, April 1996).

Furthermore, to perform image segmentation based jointly on color and texture feature, a combined input composed of color values and wavelet features can be used as the input to the methods referred to in FIG. 4. The result of joint color and texture segmentation is segmented regions of homogeneous color or texture.

The main objective of skin detection is to identify potential exposed body parts, such as arms, hands, legs, and feet. The main objective of face detection is, in addition to the obvious (identifying faces), to provide an approximate estimate of the scale so that constraints of anthropological proportions and kinetic motions can be enforced in human figure construction.

Another objective of skin detection is to reduce computational cost by eliminating from graphical model matching those regions that cannot possibly contain faces. Since such eliminated regions are not analyzed further, this step must be adjusted for a very low false negative rate, even at the expense of a high false positive rate.

Similarly, another objective of face detection is to reduce computational cost by eliminating from graphical model matching those regions that are not likely to be faces. Since such eliminated regions are not analyzed further, this step must be adjusted for a very low false negative rate, even at the expense of a high false positive rate.

Skin Region Detection (22)

The skin detection algorithm used in the present invention utilizes color image segmentation and a pre-determined skin distribution in a preferred color metric Lst (Lee, "Color image quantization based on physics and psychophysics," Journal of Society of Photographic Science and Technology of Japan, Vol. 59, No. 1, pp. 212–225, 1996). The skin regions can be obtained by classification of the average color of a segmented region. A probability value can also be retained in case the subsequent human figure-constructing step needs a probability instead of a binary decision.

The skin detection method is based on human skin color distributions in the luminance and chrominance components. In summary, a color image of RGB pixel values is converted to the preferred Lst metric. Then, a 3D histogram is formed and smoothed. Next, peaks in the 3D histogram are located and a bin clustering is performed by assigning a peak to each bin of the histogram. Each pixel is classified based on the bin that corresponds to the color of the pixel. Based on the average color (Lst) values of human skin and the average color of a connected region, a skin probability is calculated and a skin region is declared if the probability is greater than a pre-determined threshold.

Face Region Detection (24)

The face algorithm then identifies potential faces based on detection of major facial features (eyes, eyebrows, nose, and mouth) within the candidate skin regions.

A primitive face detection algorithm (FIG. 5) is used in the present invention. It combines the flesh map output by the skin detection step with other face-related heuristics to output a belief in the location of faces in an image. Each region (70) in an image that is identified as a skin region (72) is fitted with an ellipse (74). The major and minor axes of the ellipse are calculated as also the number of pixels in the region outside the ellipse and the number of pixels in the ellipse not part of the region. The aspect ratio is computed as a ratio of the major axis to the minor axis. The probability of a face is a function of the aspect ratio of the fitted ellipse, the area of the region outside the ellipse, and the area of the ellipse not part of the region. Again, the probability value can be retained or simply compared to a pre-determined threshold to generate a binary decision as to whether a particular region is a face or not.

Figure 5:
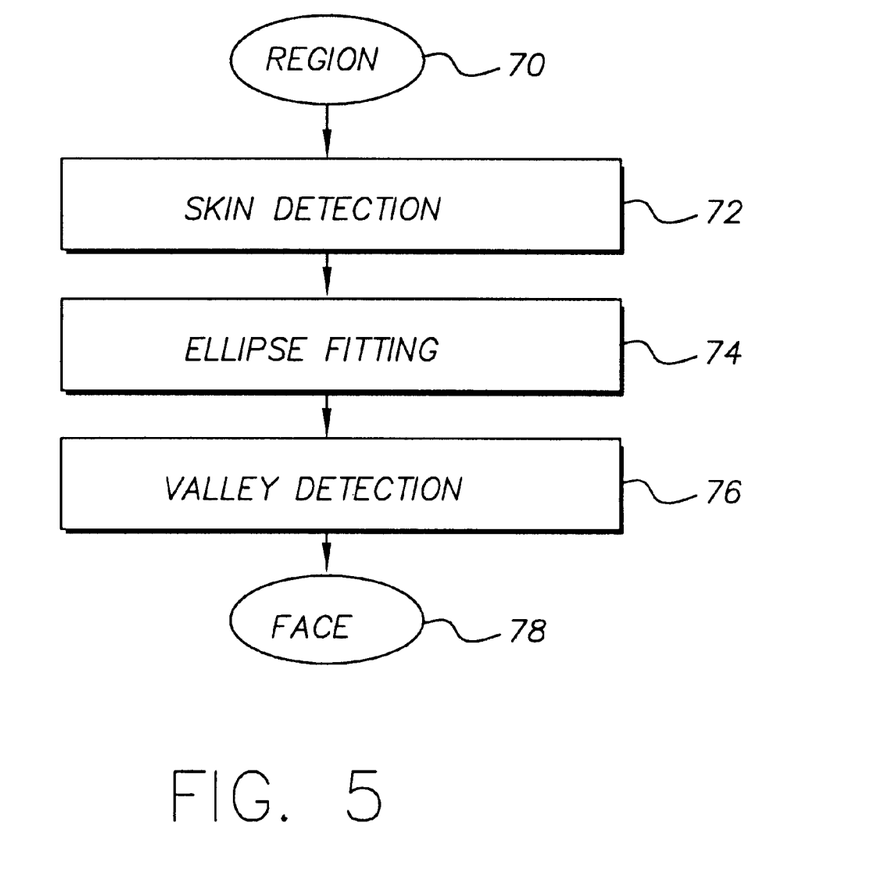
FIG. 5 is a block diagram of a face detection method used with the present invention.

In addition, texture in the candidate face region can be used to further characterize the likelihood of a face. Valley detection (76) is used to identify valleys, where facial features (eyes, nostrils, eyebrows, and mouth) often reside. This process is necessary for separating non-face skin regions from face regions (78).

Valley detection is performed in the luminance signal of the image. There are a series of gray-scale morphological operations involved here. The morphological kernel is preferred to have a hemisphere shape for best results, although a rectangular kernel facilitates separable ID filtering operations that run faster. The valley detection steps include:

Morphological Valley Detection

Morphological TOP-HAT(-) operation (typically element size=5) is then applied to the grayscale image to remove homogeneous regions and bright regions in the image (see Gonzalez and Woods, Digital Image Processing, Addison-Wesley, 1992, Chapter 8.4).

Noise Suppression

Median filtering (typically element size=3) is applied to the resulting image from the previous step to remove isolated impulsive noise pixels.

In this case, the probability of a face is then a function of the aspect ratio of the fitted ellipse, the area of the region outside the ellipse, the area of the ellipse not part of the region, and the percentage of valley pixels within the region.

It will be appreciated that a person of ordinary skill in the art can use a different face detection method without departing from the present invention. In fact, referring to FIG. 3a, face is clearly the "hub" of "network" of the human figure model. Reliable face detection would (1) narrow the scope of the search needed to be performed, and (2) reduce the number of false positives due to coincidental configurations of groups of regions that also fit the human figure model. It is reasonable to expect that such coincidental configurations are rare, therefore the next step of human figure construction can be initialized by a less than robust face detection step or even without a face detection step. In such cases, one should expect that more searches need to be performed and the false positive rate may be higher. For example, without face detection, one would have to hypothesize that each region is a potential face region and incur a very large number of searches.

Human Figure Construction (26)

Now that we have extracted all the parts, human figures can be detected if proper parts can be assembled together in a way consistent to possible human figure configurations corresponding to different poses and picture framing. Picture framing is referred to as how a picture captures the actual scene. Every picture has boundaries while the actual scene it corresponds to does not. Therefore, it is possible that certain parts of an object, for example a human figure, are cropped and do not appear in a digital image. Typically, it is more likely that a human figure is cropped at the bottom than at the top during picture framing.

Figure 3A:
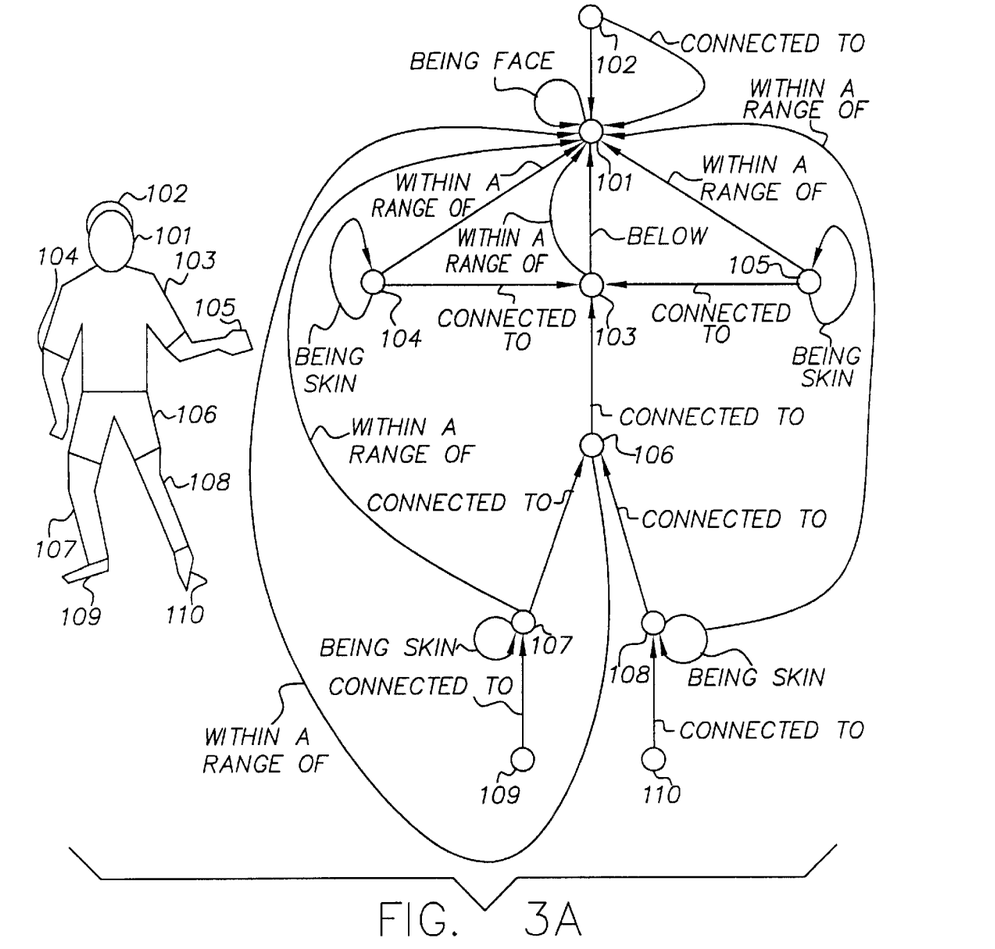
FIG. 3a is an illustration showing a full-figure model of a person and a corresponding graphical model according to the present invention.

Referring to FIG. 3a, there is shown a full-figure graphical model of a person represented using a semantic network. The nodes are body parts and the directed links encode constraints from anthropological proportions and kinetic motions. A links can either point from a node to another or to the node itself. The first encodes relationships and the second encodes properties.

The face node 101 is the "hub" or "focal point" of the network because we rely on it to derive an estimate of the scale for the rest of the body parts.

The hair node 102 is only directly linked to the face node 101, and it has to of a reasonable size relative to the face (e.g., between 10% to 100% of the face size). In fact, all the body parts have to be of reasonable sizes relative to the face; these constraints are encoded by self-pointing links (not shown in FIG. 3 for clarity). In addition, although hair color and texture may vary dramatically, common hair colors are limited (dark, fair, blonde, red, and white are likely while purple, blue, and green are not likely).

The shirt node 103 is linked to the face node 101. It is not necessarily connected to the face due to the neck and neck wear (necklace, scarf, etc.). It has to be below and within a reasonable range of the face (e.g., furthest point within 4 times the height of the face), and of relative large size compared to the face (e.g., between 400% to 800% of the size of the face). There is no restriction on the color and texture of the shirt. In addition, the shirt node is linked to the left and right arm/hand nodes 104 and 105, and the pants node 106.

The arm/hand nodes 104 and 105 have self-pointing links to enforce the requirement of the regions being skin. Arms/hands need to be within a reasonable range of the face (e.g., furthest point within 3 times the height of the face), of reasonable sizes compared to the face (e.g., 25% to 100% of the size of the face), and are directly connected to the shirt. Small wrist-wore articles such as watches and bracelets may break the skin regions of the hand from the arm, and are ignored for practical purposes.

The pants node 106 is linked to the shirt node 103, and two leg nodes 107 and 108. It has to be of reasonable size compared to the face (e.g., 200% to 600% of the size of the face) and within a reasonable range of the face (e.g., furthest point within 8 times the height of the face).

The two leg nodes 107 and 108 are linked to the pants node 106, and the two shoe nodes 109 and 110, respectively. The leg nodes have self-pointing links to enforce the requirement of skin. Legs need to be within a reasonable range of the face (e.g., furthest point within 8 times the height of the face), of reasonable sizes compared to the face (e.g., 200% to 400% of the size of the face), and are directly connected to the pants. Socks may separate the legs from the shoes, and are considered part of the shoes for practical purposes.

The shoe nodes 109 and 110 are linked to the leg nodes 107 and 108, respectively. The shoe regions need to be of reasonable sizes compared to the face (e.g., 50% of the size of the face).

Figure 3B:
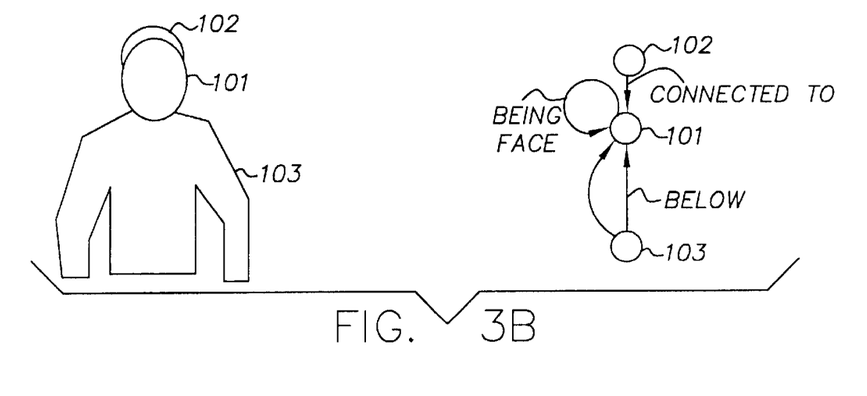
FIG. 3b is an illustration of an upper torso region of a person and corresponding graphical model according to the present invention.

FIG. 3 shows a simplified graphical model of FIG. 3d in which only nodes 101, 102 and 103 are represented.

Figure 6A:
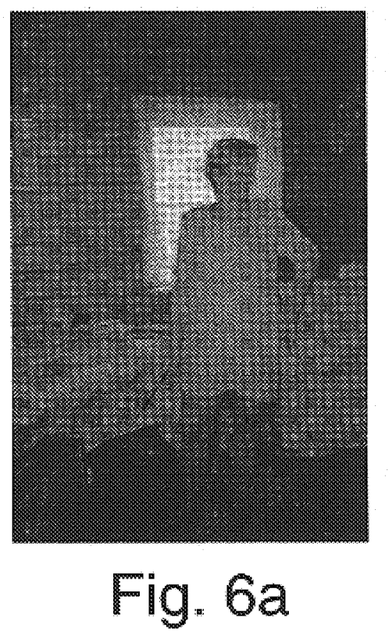
FIGS. 6a–6d are examples of human figure detection according to the present invention.
Figure 6B:
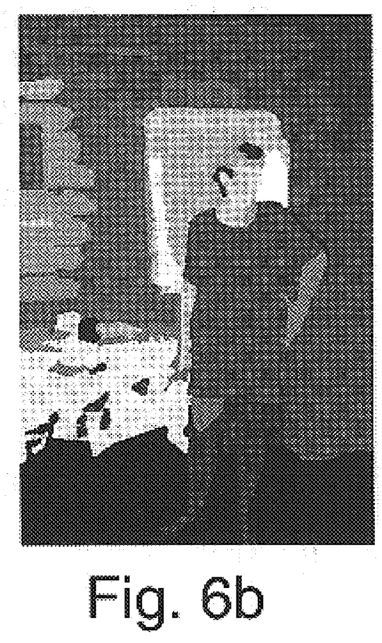
Figure 6C:
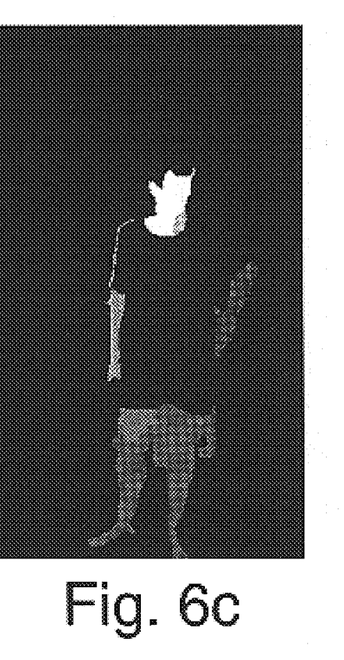
Figure 6D:
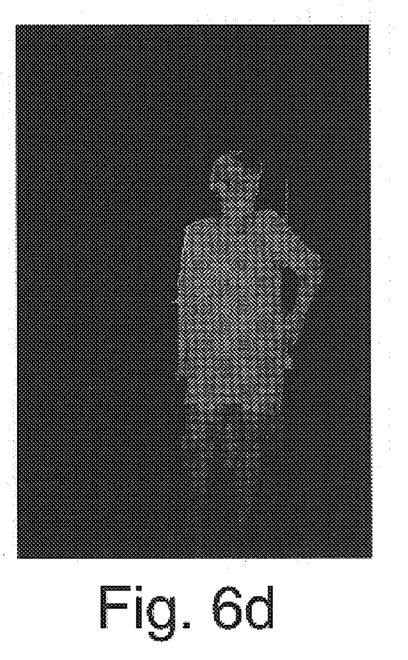
Figure 7A:
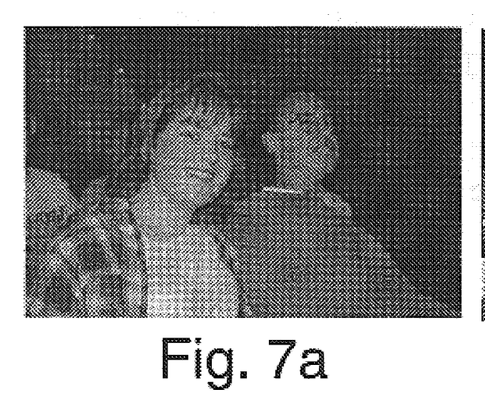
FIGS. 7a–7f are examples of human figure detection according to the present invention.
Figure 7B:
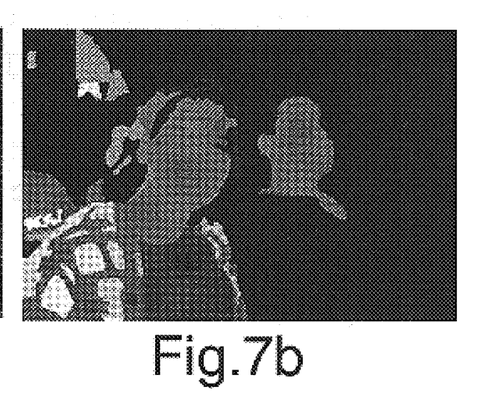
Figure 7C:
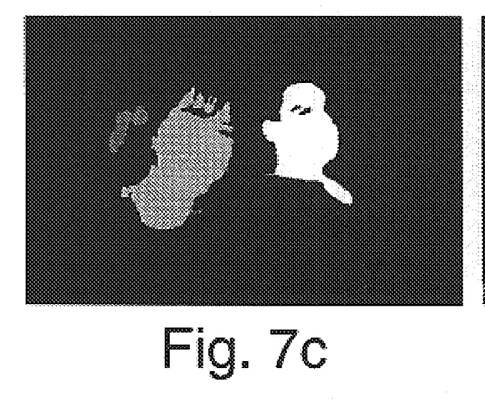
Figure 7D:
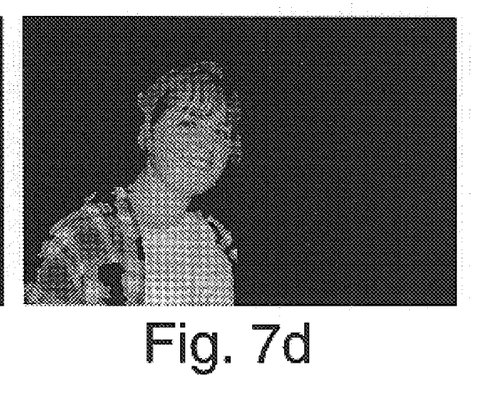
Figure 7E:
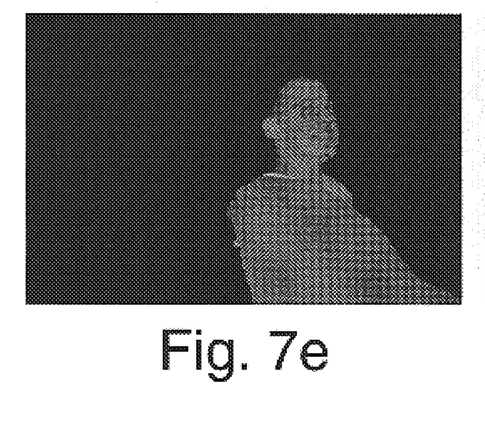
Figure 7F:
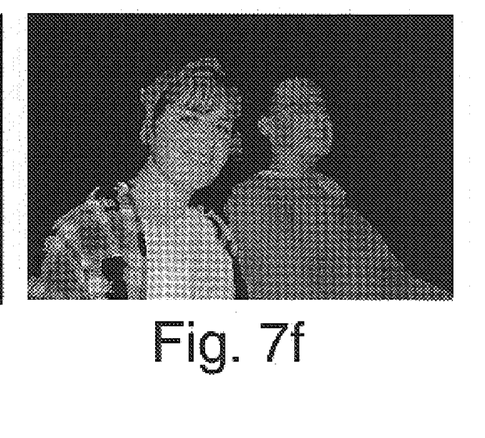

Other likely human figure configurations of possible poses and picture framing are shown in FIGS. 6a–6d and FIGS. 7a–7b. FIG. 6a shows an original image with a single full-length human image. FIG. 6b shows the result after segmentation; FIG. 6c shows the result after skin detection; and FIG. 6d shows the individual person. FIG. 7a shows an original image of the upper torso regions of two individuals. FIG. 7b shows the result after the segmentation step; FIG. 7c shows the result after the skin detection step; FIG. 7d and 7e show individuals detection, and FIG. 7f is a composite of FIGS. 7d and 7e.

The completeness of body parts varies. All the likely configurations will be examined, starting from the least complete configuration (thus human figure construction). The most complete configuration (e.g., FIG. 3a), if detected, will be assigned the highest confidence score.

The graphical models and their matching can be implemented using a number of methods, including semantic nets, B ayes nets, and factor graph. A semantic net-based implementation is described here. The semantic net encodes the links using a set of rules, each specifying the above mentioned constraints by comparing the value of an attribute to the corresponding predetermined value ranges. Each link is either "on" (valid) or "off" (invalid). In comparison, Bayes net and factor graph encodes the links using pre-determined probability functions. Therefore, it is desirable to retain the probabilities of skin and face when such probability networks are used. An overall probability of detecting a human figure is obtained after the probability network settles down.

A Bayes net (J. Pearl, *Probabilistic Reasoning in Intelligent Systems*, San Francisco, Calif.: Morgan Kaufmann, 1988) is a directed acyclic graph that represents causality relationships between various entities in the graph. The direction of links represents causality. It is an evaluation means knowing joint Probability Distribution Function (PDF) among various entities. It's advantages include explicit uncertainty characterization, fast and efficient computation, quick training, high adaptivity and ease of building, and representing contextual knowledge in human reasoning framework. A Bayes net consists of four components:

Priors: The initial beliefs about various nodes in the Bayes net

Conditional Probability Matrices (CPMs): the statistical relationship between two connected nodes in the Bayes net Evidences: Observations from feature detectors that are input to the Bayes net Posteriors: The final computed beliefs after the evidences have been propagated through the Bayes net.

A factor graph (F. R. Kschischang, B. J. Frey and H. -A. Loeliger, "Factor graphs and the sum-product algorithm", submitted to IEEE Transactions on Information Theory, July, 1998). A factor graph is a bipartite graph with variable nodes and function. A local function is associated with each function node, and is dependent only on the neighboring variables. The global function is given by the product of the local functions. A Bayes net can be converted to a factor graph, which is more general.

The subject matter of the present invention relates to digital image understanding technology, which is understood to mean technology that digitally processes a digital image to recognize and thereby assign useful meaning to human understandable objects, attributes, or conditions and then to utilize the results obtained in the further processing of the digital image.

The invention has been described in detail with particular reference to certain preferred embodiments thereof, but it will be understood that variations and modifications can be effected within the spirit and scope of the invention.

Parts List

10 input source
12 computer
14 output device
20 image segmentation module
22 skin detection module
24 face detection module
26 human figure construction
50 initial segmentation
52 whole image
54 estimate new local means
56 estimate new segmentation
58 change parameter
60 convergency reached
62 reduced window size
64 window size
101 face node
102 hair node
104 arm node
105 hand node
106 pants node
107 leg node
108 leg node
109 shoe node
110 shoe node

What is claimed is:

1. A digital image processing method for detecting human figures in a digital color image, comprising the steps of:
    providing a digital color image having pixels representing RGB values;
    segmenting the digital color image into non-overlapping regions of homogeneous color or texture;
    detecting candidate regions of human skin color;
    detecting candidate regions of human faces; and
    for each candidate face region, constructing a human figure by grouping regions in the vicinity of the face region according to a pre-defined graphical model of the human figure, giving priority to human skin color regions.

2. The method as claimed in claim 1, wherein the segmenting step includes classifying pixels having RGB values based on color/texture.

3. The method as claimed in claim 1, wherein the step of detecting skin color regions includes classifying pixels having predetermined RGB values.

4. The method as claimed in claim 3, wherein the graphical model is represented by a semantic net in which the links are specified by a set of pre-determined rules.

5. The method as claimed in claim 3, wherein the graphical model is represented by a Bayesian network in which the links are specified by a set of pre-determined conditional probability matrices.

6. The method as claimed in claim 3, wherein the graphical model is represented by a factor graph in which the links are function nodes specified by a set of pre-determined functions.

7. The method as claimed in claim 1, wherein the step of detecting face regions includes searching for a predetermined intensity pattern representative of a human face, by matching the shape of and the amount of intensity valley features within a skin color region.

8. The method as claimed in claim 1, wherein the constructing step includes grouping skin color regions as exposed body parts, and non-skin colored regions as clothing.

9. The method as claimed in claim 8, wherein each node comprises one or more segmented regions.

10. The method as claimed in claim 1, wherein the graphical model is derived based on anthropological proportions and kinetics of human body movements.

11. The method as claimed in claim 1, wherein the constructing step includes using a collection of graphical models of the human figure for different poses and picture framing.

12. The method as claimed in claim 1, wherein the graphical model comprises a collection of nodes corresponding to body parts, and links between nodes characterizing the relationships between body parts.

13. A digital image processing method for detecting human figures in a digital color image having pixels representing RGB values, comprising the steps of:

provinding a digital color image having pixels representing RGB values;

segmenting the digital color image into non-overlapping regions of homogeneous color or texture;

selecting a region as a candidate face region;

attempting to construct a human figure by grouping regions in the vicinity according to a pre-defined graphical model of the human figure; and identifying the grouped regions as a human figure if the constructed figure meets predetermined criteria.

* * * * *